United States Patent [19]

Dick

[11] Patent Number: 5,074,573
[45] Date of Patent: Dec. 24, 1991

[54] PIVOTAL FRONT WHEEL FENDERS FOR TRACTORS

[76] Inventor: Michael H. Dick, 206 South St., Schaller, Iowa 51053

[21] Appl. No.: 491,690
[22] Filed: Mar. 12, 1990
[51] Int. Cl.⁵ .............................................. B62B 9/16
[52] U.S. Cl. ............................... 280/157; 248/289.3; 280/154; 280/156; 280/847; 280/848
[58] Field of Search .............. 280/847, 848, 154, 849, 280/156, 157; 248/289.1, 289.3

[56] References Cited

U.S. PATENT DOCUMENTS

| | | | |
|---|---|---|---|
| 886,506 | 5/1908 | Holsman | 280/157 |
| 1,049,946 | 1/1913 | Tyrell | 280/157 |
| 1,613,443 | 1/1927 | D'Amato | 280/157 |

FOREIGN PATENT DOCUMENTS

| | | | |
|---|---|---|---|
| 613702 | 11/1926 | France | 280/157 |
| 85147 | 9/1920 | Switzerland | 280/157 |

Primary Examiner—Andres Kashnikow
Assistant Examiner—Eric Culbreth
Attorney, Agent, or Firm—Zarley, McKee, Thomte, Voorhees & Sease

[57] ABSTRACT

This invention is an improvement in a vehicle having a frame, a front axle, steerable wheels on the axle, and fenders on the wheels. Fender frames are pivotally mounted on the axle and are adapted to pivot about a substantially vertical axis. A fender is mounted on each of the fender frames and is normally positioned over and in alignment with the steerable wheels. A resilient element is operatively connected to the fenders to maintain the fenders over and in alignment with the steerage wheels, while permitting the fenders to pivot to a position of disalignment with at least one of the steerable wheels when the steerable wheels are moved to an angular position with respect to the axle to cause at least one of the fenders to contact the frame of the vehicle.

4 Claims, 1 Drawing Sheet

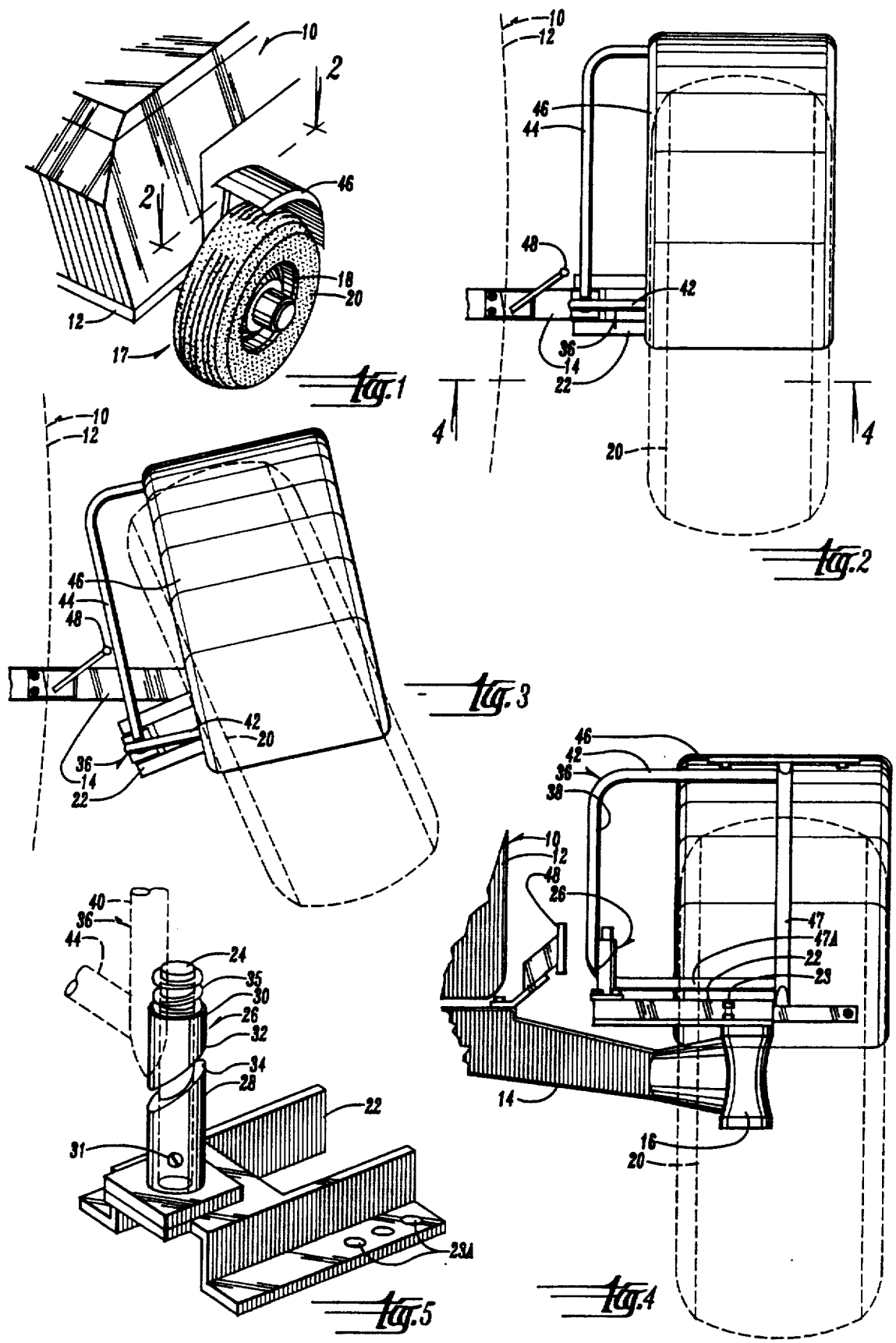

PIVOTAL FRONT WHEEL FENDERS FOR TRACTORS

BACKGROUND OF THE INVENTION

Farm tractors are often equipped with fenders for the front wheels thereof to reduce the splattering of mud and snow when the tractor is operated in inclement conditions. A problem commonly encountered with tractor wheel fenders is that at least one of the fenders may forcibly engage the frame of the tractor when the front wheels are turned at a sharp angle, thereby damaging the fender. This is particularly true when the tractor wheels are set for use in row crops having narrow rows which are 30 inches on center.

It is therefore a principal object of this invention to provide pivotal front wheel fenders for tractors so that when the front wheels of the tractor are turned at a sharp angle, and when the fenders engage the tractor frame or a stop means thereon, the fenders will angularly pivot with respect to the wheel so that they will not be damaged upon engagement with the tractor frame or the stop means thereon.

A further object of this invention is to provide pivotal front wheel fenders for tractors that can be easily installed on existing equipment.

A still further object of this invention is to provide pivotal front wheel fenders for tractors which are economical of manufacture and durable in use.

These and other objects will be apparent to those skilled in the art.

BRIEF SUMMARY OF THE INVENTION

This invention is an improvement in a vehicle having a frame, a front axle, steerable wheels on the axle, and fenders on the wheels. Fender frames are pivotally mounted on the axle and are adapted to pivot about a substantially vertical axis. A fender is mounted on each of the fender frames and is normally positioned over and in alignment with the steerable wheels. A resilient means is operatively connected to the fenders to maintain the fenders over and in alignment with the steerage wheels, while permitting the fenders to pivot to a position of disalignment with at least one of the steerable wheels when the steerable wheels are moved to an angular position with respect to the axle to cause at least one of the fenders to contact the frame of the vehicle.

BRIEF DESCRIPTION OF THE DRAWINGS

FIG. 1 is a partial perspective view of a tractor showing the fender of this invention mounted on a front wheel thereof;

FIG. 2 is a top plan view thereof at an enlarged scale taken on line 2—2 of FIG. 1;

FIG. 3 is a top plan view similar to that of FIG. 2, but shows the front wheel at an angular position with respect to the tractor frame, and shows the fender at an angular position with respect to the front wheel;

FIG. 4 is a rear elevational view taken on line 4—4 of FIG. 2; and

FIG. 5 is an enlarged scale perspective view of the base member which supports the fender frame.

BRIEF DESCRIPTION OF THE INVENTION

The numeral 10 designates a typical farm tractor having a frame 12, a forward axle 14, a spindle 16, a wheel 17 comprised of a tire rim 18 mounted thereon, and a pneumatic tire 20 mounted on the rim. Components 16-20 are located on each end of axle 14.

A base member 22 is secured to the spindle (or front end housing) in any convenient means such as by bolts 23 (FIG. 4). Holes 23A in base member 22 (FIG. 5) are adapted to receive the bolts 23. Spindle 16 is conventional and can pivot with wheel 17 about a vertical axis.

A vertical shaft 24 is welded by its lower end to base member 22. A sleeve 26 is mounted on shaft 24 and comprises a lower stationary bushing 28 and an upper pivotal bushing 30 which normally engage each other through their respective tapered cam surfaces 32 and 34, (shown separated in FIG. 5 for clarity, only). Bushing 28 can be secured to shaft 24 by set screw 31. A torsion spring 35 embraces the upper end of shaft 24 and has its upper end rigidly secured to the shaft and its lower end rigidly secured to upper bushing 30.

A fender frame 36 includes an L-shaped frame member 38 which has a vertical leg 40 welded to pivotal bushing 30, and a horizontal leg 42 which extends over tire 20. A horizontal frame arm 44 is rigidly secured to upper bushing member 30 and extends to supporting engagement with the rearward end of fender 46. Horizontal leg 42 of L-shaped frame member 38 supports the upper portion of fender 46. Frame arm 47A on the rearward end of horizontal frame arm 44 is connected to leg 42 by arm 47 which extends within fender 46 between arm 47A and leg 42.

A stop member 48 (FIG. 4) is bolted or otherwise secured to either axle 14 or tractor frame 12 to dwell in the pivotal path of horizontal frame arm 44.

The normal operation of the invention is as follows: When the tractor is proceeding in a substantially straight path, as depicted in FIGS. 1 and 2, the fender 46 is resiliently held in a position over and in alignment with the tire 20. However, when the front wheels of the tractor are turned (by suitable tie rods, not shown) to a sharp turning position as shown in FIG. 3, the horizontal frame arm 44 engages the stop member 48 before the fender has an opportunity to forcibly engage the tractor frame 12. Fender frame 36 initially pivots with base member 22 and spindle 16. The stop member 48, through the fender frame 36, causes upper bushing 30 to pivot on shaft 24 which causes the upper bushing member to rise upwardly on the cam surface 32 of the lower stationary bushing 28. This upper movement of bushing 30 compresses spring 35 which remains under compression as long as the fender 46 is in a position of disalignment with tire 20 (FIG. 3).

When the tractor wheels are moved to a position of alignment with the tractor frame as shown in FIG. 2, spring 35 forces upper bushing 30 downwardly on shaft 24, and causes the fender frame 36 and the fender 46 secured thereto to reassume the position of alignment with the tractor wheel.

It should be understood that while only one fender of the tractor has been shown in the drawings, each of the front wheels of the tractor will have a corresponding structure thereon. Stop members 48 will also be located in conjunction with each of the fender frames. Normally, when the tractor wheels are turned to a sharp angular position, only one fender will be pivoted to a position of disalignment with one of the forward tractor wheels.

This invention will eliminate damage to the fenders on the front wheels of tractors when the wheels are turned or steered to a sharp angular position with respect to the tractor frame. It is therefore seen that this invention will achieve at least its stated objectives.

I claim:

1. An improvement in a vehicle having a frame, a front axle, steerable wheels on said axle, and fenders on said wheels, the improvement comprising,
fender frames pivotally mounted on said axle and being adapted to
pivot about a substantially vertical axis,
a fender on each of said fender frames and normally being positioned over and in alignment with steerable wheels, stop means on said vehicle,
and resilient means operatively connected to said fenders to maintain said fender over and in alignment with said steerable wheels, while permitting said fenders to pivot to a position of disalignment with at least one of said steerable wheels when said steerable wheels are moved to an angular position with respect to said axle to cause at least one of said fenders to contact said stop means to prevent any damaging contact between said fender and said vehicle.

2. An improvement in a vehicle having a frame, a front axle, steerable wheels on said axle, and fenders on said wheels, the improvement comprising,
fender frames pivotally mounted on said axle and being adapted to
pivot about a substantially vertical axis,
a fender on each of said fender frames and normally being positioned over and in alignment with steerable wheels, stop means on said vehicle,
and resilient means operatively connected to said fenders to maintain said fender over and in alignment with said steerable wheels, while permitting said fenders to pivot to a position of disalignment with at least one of said steerable wheels when said steerable wheels are moved to an angular position with respect to said axle to cause at least one of said fenders to contact said stop means to prevent any damaging contact between said fender and said vehicle,
mounting posts connecting said axle and said fender frames, said mounting posts comprising a base means secured to said wheel, a vertical shaft, a pivotal bushing on said shaft secured to said fender frames, said resilient means comprising spring means connecting said pivotal bushing and said shaft to resiliently maintain said fender frames in a normal position where said fenders are over and in alignment with said steerable wheels.

3. The device of claim 2 wherein said mounting post includes a stationary bushing under said pivotal bushing, said stationary bushing having a cam surface in pivotal contact with said pivotal bushing so that when said pivotal bushing pivots on said shaft, said spring means will be compressed.

4. The device of claim 3 wherein said stationary and pivotal bushings are sleeves mounted on said shaft, and said cam surface is a first angular surface on said stationary bushing, and engaging a second angular surface on said pivotal bushing.

* * * * *